United States Patent [19]

Martin

[11] Patent Number: 5,080,487
[45] Date of Patent: Jan. 14, 1992

[54] RING LASER GYROSCOPE WITH GEOMETRICALLY INDUCED BIAS

[75] Inventor: Graham J. Martin, Canoga Park, Calif.

[73] Assignee: Litton Systems, Inc., Beverly Hills, Calif.

[21] Appl. No.: 928,069

[22] Filed: Nov. 6, 1986

[51] Int. Cl.$^5$ .............................................. G01C 19/68
[52] U.S. Cl. ...................................... 356/350; 372/94
[58] Field of Search ........................... 356/350; 372/94

[56]  References Cited

U.S. PATENT DOCUMENTS

| | | |
|---|---|---|
| 3,395,270 | 7/1968 | Speller . |
| 3,411,849 | 11/1968 | Aronowitz . |
| 3,503,005 | 3/1970 | Mocker . |
| 3,697,887 | 10/1972 | Lee et al. . |
| 3,807,866 | 4/1974 | Zingery . |
| 3,826,575 | 7/1974 | Walter, Jr. . |
| 3,854,819 | 12/1974 | Andringa . |
| 3,973,851 | 8/1976 | Ferrar . |
| 4,213,705 | 7/1980 | Sanders . |
| 4,229,106 | 10/1980 | Dorschner . |
| 4,247,832 | 1/1981 | Sanders et al. . |
| 4,267,478 | 5/1981 | Ljung et al. . |
| 4,383,763 | 5/1983 | Hutchings et al. . |
| 4,470,701 | 9/1984 | Smith ................................. 356/350 |
| 4,637,255 | 1/1987 | Martin ................................. 356/349 |

OTHER PUBLICATIONS

A. D. White, "Frequency Stabilization Gas Lasers", IEEE, Journal of Quantum Electronics, vol. QE-1, No. 8, Nov. 1965, pp. 349-357.
H. de Lang, "Eigenstates of Polarization in Gas Lasers", pp. 429-440.
Facklam, "Ultra-Stable Laser Clock", 36th Annual Frequency Control Symposium, 1982.
Facklam, "Ultra-Stable Laser Clock, Second Generation".
Coccoli, "An Overview of Laser Gyros", 12th Joint Services Data Exchange for Inertial Systems, Norfolk, VA 1978.
Menegozzi et al., "Theory of a Ring Laser", 1973, *Physical Review*, vol. 8, No. 4, pp. 2103-2125.
Kilpatrick, "The Laser Gyro", Oct. 1967, *IEEE Spectrum*, pp. 44-55.
Chow, et al. "Multioscillator Laser Gyros," IEEE Journal of Quantum Electronics, vol. QE 16, No. 9, Sep. 1980, pp. 918-936.

*Primary Examiner*—Samuel Turner
*Attorney, Agent, or Firm*—Lynn & Lynn

[57] ABSTRACT

An out of plane ring laser gyroscope comprises a frame and a cavity formed in the frame to provide a non-planar closed optical pattern. A gain medium produces two light beams propagating in opposite directions in the cavity. A magnetic device applies an axial magnetic field to the gain medium to allow only light of opposite circular polarizations to lase in opposite directions. The gain medium and resonant cavity alone will allow left and right circularly polarized modes to lase in both clockwise and anticlockwise directions simultaneously. The application of the axial magnetic field to the gain region shifts the center of the gain profile for the clockwise right circularly polarized and anticlockwise left circularly polarized beams with respect to the gain profile center for the anticlockwise right circularly polarized and clockwise left circularly polarized beams. The cavity length can then be adjusted so that lasing action in two of the four modes is suppressed leaving only modes of opposite polarization propagating in opposite directions. The out of plane geometry of the cavity forces these modes to resonate at greatly different frequencies and hence prevents frequency locking over a very large range of input rotation rates.

33 Claims, 5 Drawing Sheets

RING LASER GYROSCOPE WITH GEOMETRICALLY INDUCED BIAS

BACKGROUND OF THE INVENTION

This invention relates generally to rotation sensors and particularly to ring laser gyroscope rotation sensors. Still more particularly, this invention relates to apparatus and methods for reducing errors in measurements made with ring laser gyroscopes caused by the tendency of the cour terpropagating beams of ring laser gyroscopes to lock to a common frequency at low rotation rates.

A ring laser gyroscope employs the Sagnac effect to detect rotation. Two counter propagating light beams in a planar closed loop will have transit times that differ in direct proportion to the rotation rate of the loop about an axis perpendicular to the plane of the loop. The planar ring laser gyroscope has the simplest type of optical path. However, other path geometries provide advantages over the planar path.

There are in general two basic techniques for utilizing the Sagnac effect to detect rotations. A first technique is the interferometric approach, which involves measuring the differential phase shift between two counterpropagating beams injected from an external source, typically a laser, into a Sagnac ring. The ring may be defined by mirrors that direct the light beams around the path or by a coil of optical fiber. Beams exiting the path interfere and create a pattern of light and dark lines that is usually called a fringe pattern. Absolute changes in the fringe pattern are indicative of rotation of the ring. The primary difficulty with such devices is that the changes are very small for rotation rates of interest in guidance applications.

A ring laser gyroscope has a sensor axis that passes through the closed path traversed by the counterpropagating beams. For a planar path, the sensor axis is conveniently normal to the path. In an out of plane gyro, the sensor axis may be a line normal to the projection of the path upon a plane. When the ring laser gyroscope is not rotating about its sensor axis, the optical paths for the two counterpropagating beams have identical lengths so that the two beams have identical frequencies. Rotation of the ring laser gyroscope about its sensor axis causes the effective path length for light traveling in the direction of rotation to increase while the effective path length for the wave traveling opposite in direction to the rotation decreases.

The ring laser gyroscope uses the resonant properties of a closed cavity to convert the Sagnac phase difference between the counter propagating beams into a frequency difference. Ring laser gyroscopes may be classified as passive or active, depending upon whether the gain medium is external or internal to the cavity. In the active ring laser gyroscope the cavity defined by the closed optical path becomes an oscillator, and output beams from the two directions interfere to give a beat frequency that is a measure of the rotation rate. The oscillator approach means that the frequency filtering properties of the cavity resonator are narrowed by many orders of magnitude below the passive cavity to give the potential for very precise rotation sensing. To date, the major ring laser gyroscope rotation sensor effort has been put into the active ring laser. Presently all commercially available optical rotation sensors are active ring laser gyroscopes.

When the rotation rate of the ring laser gyroscope is within a certain range, the frequency difference between the beams disappears. This phenomenon is called frequency lock-in, or mode locking, and is a major difficulty with the ring laser gyroscope because at low rotation rates the ring laser gyroscope produces a false indication that the device is not rotating. If the rotation rate of a ring laser gyroscope starts at a value above that where lock-in occurs and is then decreased, the frequency difference between the beams disappears at a certain input rotation rate. This input rotation rate is called the lock-in threshold. The range of rotation rates over which lock-in occurs is generally called the deadband of the ring laser gyroscope.

Lock-in arises from coupling of light between the beams. The coupling results primarily from backscatter off the mirrors that confine the beams to the closed path. Backscatter causes the beam in each direction to include a small component having the frequency of the beam propagating in the other direction. The lock-in effect in a ring laser gyroscope is similar to the coupling that has been long been observed and understood in conventional electronic oscillators.

In addition to causing erroneous rotation rate information to be output from a ring laser gyroscope, lock-in causes standing waves to appear on the mirror surfaces. These standing waves may create a grating of high and low absorption regions, which creates localized losses that increase the coupling and the lock-in. The mirrors may be permanently affected by leaving a ring laser gyroscope operating in a lock-in condition.

Any inability to accurately measure low rotation rates reduces the effectiveness of a ring laser gyroscope in navigational systems. There has been substantial amount of research and development work to reduce or eliminate the effects of lock-in to enhance their effective use in such systems.

There are several known attempts to solve the problems of lock-in. One such approach involves mechanically oscillating the ring laser gyroscope about its sensor axis so that the device is constantly sweeping through the deadband and is never locked therein. This mechanical oscillation of the ring laser gyroscope is usually called dithering. A typical ring laser gyroscope may be dithered at about 400 Hz with an angular displacement of a few arc minutes.

Mechanically dithering the ring laser gyroscope body is accomplished by mounting the ring laser gyroscope frame on a flexure device that includes a plurality of vanes or blades extending from a central portion. Each blade has a pair of piezoelectric elements mounted on opposite sides thereof. Voltages are applied to the piezoelectric elements such that one piezoelectric element on each blade increases in length while the other piezoelectric element decreases in length. The effect of these length changes in the piezoelectric elements is transmitted to the blades through the mounting of the piezoelectric elements thereon. Increasing the length of one side of each blade while shortening the other side causes the blades to flex or bend so that the end of each blade experiences a small rotation about the ring laser gyroscope axis. The voltage is oscillatory so that the blades are constantly vibrating in phase, and the ring laser gyroscope frame mounted to the blades rotates about the axis.

The amplitude of the dithering is generally carefully controlled and monitored to minimize the effects of lock-in. Since the dither oscillation angular velocity and displacement relative to a support structure can be constantly monitored, they may be excluded from the output signal of the ring laser gyroscope. However, it has been found that a constant dithering amplitude is inadequate to eliminate all of the effects of lock-in.

Body dither must be accomplished so that dither oscillations cause the ring laser gyroscope frame to rotate only about the sensing axis. Any small component of rotation about other axes causes the sensing axis to precess in a cone-shaped path about the direction in which it should point. This motion of the axis is called coning. Any change in the direction of the axis due to dithering introduces errors into the output of the ring laser gyroscope. Since a navigation system includes three ring laser gyroscopes mounted in an instrument block with the sensing axes being mutually orthogonal, mechanical coupling of the dither oscillations is likely.

Mirror dither is another approach that has been investigated in attempts to reduce the effects of lock-in. One or more of the mirrors that define the optical path may be oscillated at a very small amplitude. The Doppler effect causes a difference between the frequency of backscattered light and forward reflected light. Transverse dithering of all four mirrors of a rectangular gyro shifts only the frequency of the backscattered beam. However, transverse mirror dither is difficult to implement because of the large amount of energy required to move mirrors that are mounted to the gyro body. Longitudinal mirror dither is easier to implement, but it shifts the frequencies of both the forward and backscattered light. Therefore, the analysis of signals in a longitudinally mirror dithered gyro is complicated.

One approach to reducing lock-in error is to superimpose a random signal upon the amplitude of the dither driving amplifier. However, the superposition of a random signal on the dither driver produces other substantial errors.

Another approach uses a Faraday cell to apply an alternating bias to the gain medium. The driving function for the Faraday cell dithered bias is the voltage applied to the Faraday cell coil. The voltage may change quickly, but the coil current and, hence, the magnetic field change slower than the voltage because of the resistance-inductance time constant of the coil.

It should be noted that when the sign or direction of the dither reverses, the two beams tend to lock-in since at some point the frequency difference therebetween is zero. Since the output angle of the ring laser gyroscope is generally derived from the frequency difference, which locks in to indicate a zero rotation rate even if the actual rotation rate is non-zero, an error accumulates in the output angle. The periods of time when the two beams are locked in are usually very short so that the resulting output angle error is very small for any single sign change. Nevertheless, the error resulting from lock-in during sign reversal of the frequency difference is cumulative, and in time may become significant, particularly in precision navigational systems. This error is sometimes called random walk or random drift.

Still another technique for optical biasing to prevent lock-in is to use a twin ring gyro. The two optical paths are arranged so that they share the same magnetic biasing element. The paths of the beams are not identical, which is a source of error.

SUMMARY OF THE INVENTION

The present invention provides apparatus and methods for producing a nonreciprocal bias in an out of plane ring laser gyroscope. This invention therefore provides a ring laser gyroscope that does not require dithering in order to avoid mode locking.

An out of plane ring laser gyroscope according to the invention comprises a frame and a cavity formed in the frame to give a non-planar closed optical path of predetermined length. A gain medium produces two light beams propagating in opposite directions in the cavity. The present invention involves a technique which alloys only light of opposite circular polarizations to lase in opposite directions. This technique includes means for applying a magnetic field to the plasma region of the gain medium. The magnetic field is preferably uniform and axially directed in the gain medium to divide the excited energy states of the neon atoms into several states. The magnetic flux may be provided by a permanent magnet or an electromagnet. Note that this magnetic field does not produce any bias between the two counterpropagating beams used for rotation sensing. This necessary bias is provided by the geometry of the light path.

The gain medium of a ring laser gyroscope according to the invention produces a clockwise beam and an anticlockwise beam that both include a right circularly polarized component and a left circularly polarized component. The applied magnetic field preferably decreases the center frequency of the gain curves for the clockwise left circularly polarized and the anticlockwise right circularly polarized component and increases the center frequency of the gain curves for the clockwise right circularly polarized component and the anticlockwise left circularly polarized component. Alternatively, the applied magnetic field may increase the center frequency of the gain curves for the clockwise left circularly polarized and the anticlockwise right circularly polarized component and decrease the center frequency of the gain curves for the clockwise right circularly polarized component and the anticlockwise left circularly polarized component. The direction of the magnetic field determines which gain curve centers are increased or decreased.

The apparatus of the invention may further include means for adjusting the cavity length such that only one polarization component lases in the clockwise beam and only an opposite polarization component lases in the anticlockwise beam.

The method of the invention comprises the steps of producing two light beams propagating in opposite directions in a gain medium confined to a cavity, and manipulating the gain medium to allow only light of opposite circular polarizations to lase in opposite directions. The method of the invention preferably comprises the step of applying an axially directed magnetic field applied to the gain medium.

The method according to the invention may further include the step of adjusting the cavity length to permit only a first selected polarization to lase in a first direction around the cavity and a second polarization opposite from the first polarization to lase in a direction opposite to the first direction.

The method may further include the steps of decreasing the centers frequency of the gain curves for the clockwise left circularly polarized and the anticlockwise right circularly polarized component; increasing the centers frequency of the gain curves for the clockwise right circularly polarized component and the anticlockwise left circularly polarized component; and adjusting the cavity length such that only one polarization component lases in the clockwise beam and only an opposite polarization component lases in the anticlockwise beam.

DESCRIPTION OF THE PREFERRED EMBODIMENT

Figure 1:
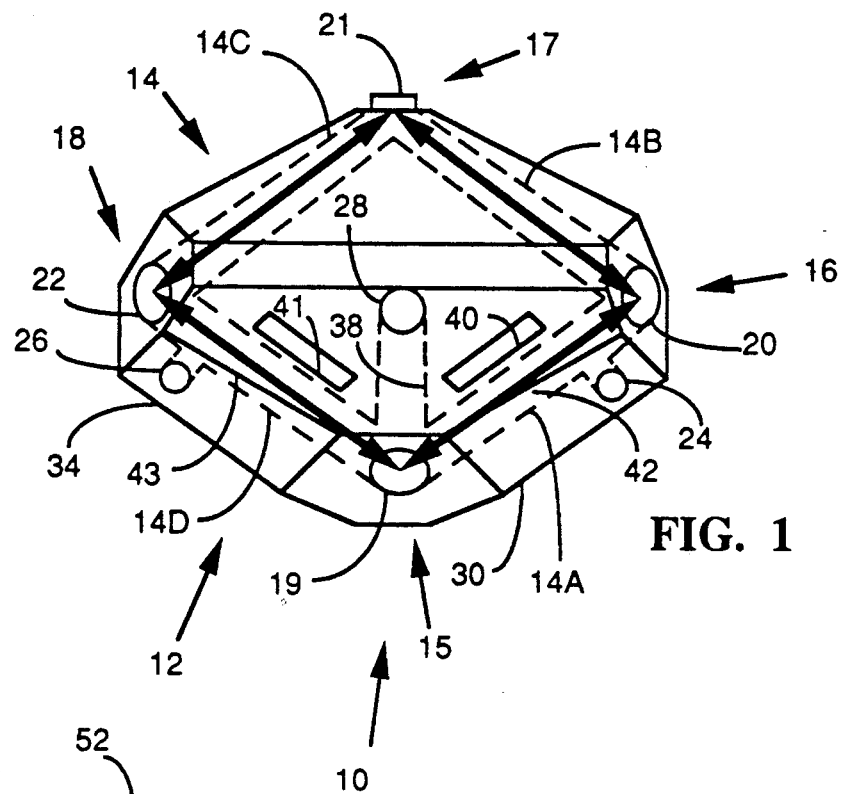
FIG. 1 is a perspective view of an out of plane ring laser gyroscope frame.

Referring to FIG. 1, an out of plane ring laser gyroscope 10 includes a frame 12 that is preferably formed of a material having very small dimensional changes over a temperature range of about $-50°$ F. to $+240°$ F. Schott glass works of West Germany sells a suitable frame material under the trademark ZERODUR. Owens, Ill. sells a suitable frame material under the trademark CERVIT. Both ZERODUR and CERVIT are mixtures of glass and ceramic materials that have opposite temperature expansion coefficients, thus providing overall minimal dimension changes over a wide range of temperatures.

A cavity 14 is formed in the frame 12. The cavity 14 has four corners 15-18 at which mirrors 19-22, respectively, are mounted to the frame 12. The cavity 14 is shown to be formed as a skew rhombic quadrilateral, which may be visualized as a rhombus that has been folded along its diagonals. This is one of many possible configurations for the cavity 14 and is described herein for the purpose of explaining the invention. The present invention may be practiced with any out of plane light path in which the beams may circulate.

The cavity 14 may comprise a plurality of bores 14A, 14B, etc. to form a path for counter propagating light beams in the frame 12 between the mirrors 19-22. The frame 12 is generally formed as a solid piece of Zerodur and the bores 14A-14D are formed by machining. In FIG. 1 the arrows in the cavity 14 represent the counterpropagating beams. The bores are evacuated and then filled with a mixture of helium and neon. This mixture is the gain medium of the laser. A pair of anodes 24 and 26 and a cathode 28 are mounted to the frame in contact with the gain medium so that application of a suitable electrical potential differnce between the cathode 28 and each of the anodes 24 and 26 produces an electrical discharge in the bore 14A and 14D.

The anode 24 may be mounted to a surface 30 of the frame 12, and a passage 32 extends between the anode 24 and the bore 14A. The anode 26 may be mounted to a surface 34 of the frame 12, and a passage 36 extends between the anode 26 and the bore 14D. The cathode 28 may be mounted in the central portion of the frame 12. A passage 38 extends between the cathode 28 and the juncture of the bores 14A and 14D. Other arrangements of the anodes and cathodes are possible. The particular arrangements shown and described herein are exemplary only and do not limit the scope of the invention.

When an appropriate potential difference is applied between cathode 28 and the anodes 24 and 26, electrical discharges occur in the bores 14A and 14D. This electrical discharge forms a plasma in cavity 14 by exciting the helium and neon atoms. Collisions with electrons excite helium atoms, which then collide with some of the neon atoms. The most probable result of collisions between the excited helium atoms and the neon atoms is a transfer of energy from the helium to the neon atoms to excite them to an unstable energy state. Electrons in the plasma also may collide with neon atoms and excite them to the same energy unstable state, but the helium atoms are the primary excitation source for raising the neon atoms to the desired energy level. The excited neon atoms return to their ground states by emitting photons. There is a spectrum of photon frequencies that may be produced when the neon atoms return to their ground state. The length of the cavity 14 between the mirrors 17-20 allows only select wavelengths to resonate within the cavity. Only those resonating wavelengths which lie above threshold in the gain curve shown in FIG. 10 can lase.

The present invention uses circularly polarized light. In the ideal case for perfect mirrors (which produce a $\pi$ phase shift between S and P linearly polarized modes), upon reflection from the mirror 17, for example, a right circularly polarized (RCP) wave will experience a change to left circular polarization (LCP). In order to maintain the lasing action to produce the desired polarizations, the beams must reflect from an even number of mirrors. Both RCP and LCP waves will lase in the cavity for both the clockwise beam and the anticlockwise beam. Therefore, four different waves may propagate in the cavity 14. These four waves may be conveniently identified:

$L_a$ is the anticlockwise left circularly polarized wave;
$L_c$ is the clockwise left circularly polarized wave;
$R_a$ is the anticlockwise right circularly polarized wave; and
$R_c$ is the clockwise right circularly polarized wave.

The longitudinal mode spacing of the beams may be about 1 GHz. The lenght of the cavity is an integer multiple of the wavelengths that resonate. If the cavity length is L, then $N_1\lambda_1=L$, where $N_1$ is an integer and $\lambda_1$ is the wavelength. The reciprocal of the wavelength is $1\lambda_1=N_1/L$. The corresponding frequency is $f_1=c\lambda_1$. Therefore, the frequency is $f_1=cN_1/L$. If the frequency $f_1$ lases because the cavity length is an integer number of wavelengths, then the frequency $f_2$ corresponding to $(N_1+1)\lambda_2$ may also lase. This second frequency may be expressed as $f_2 = c(N_1+1)/L$. The difference in the two adjacent lasing frequencies is the mode spacing, which is $f_2 - f_1 = c/L$. A mode spacing of 1 GHz corresponds to a cavity length of about 30 cm.

Referring to FIGS. 1-9, a uniform magnetic flux density is applied along the axes of the bores 14A and 14D where gain medium lies. The magnetic flux density is preferably about 100-200 gauss. The magnetic field interacts with the spin magnetic moments of the excited electrons in the neon atoms to split the excited unstable states of the into several discrete energy levels. As the electrons in each of these discrete levels radiates to return to the ground state, photons of different frequency are emitted.

Figure 2:
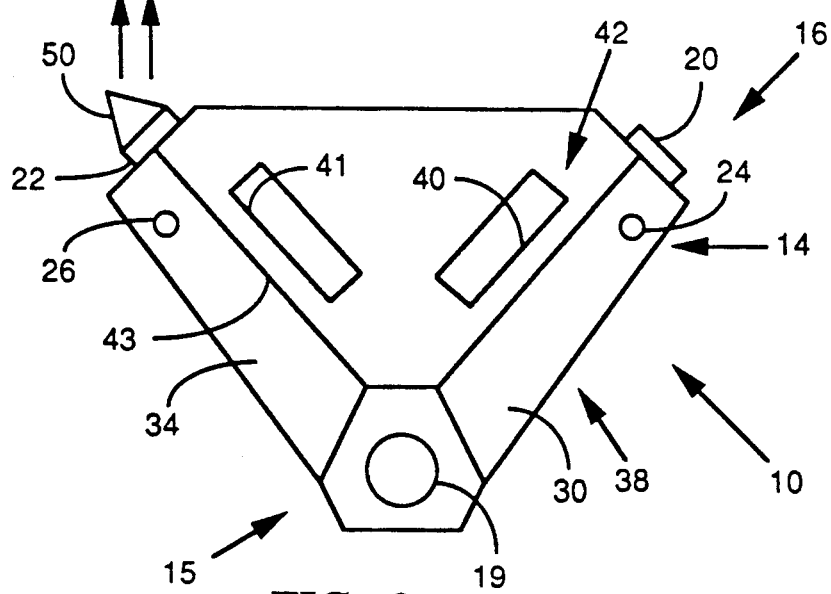
FIG. 2 is an elevation view of the out of plane ring laser gyroscope frame of FIG. 1.
Figure 3:
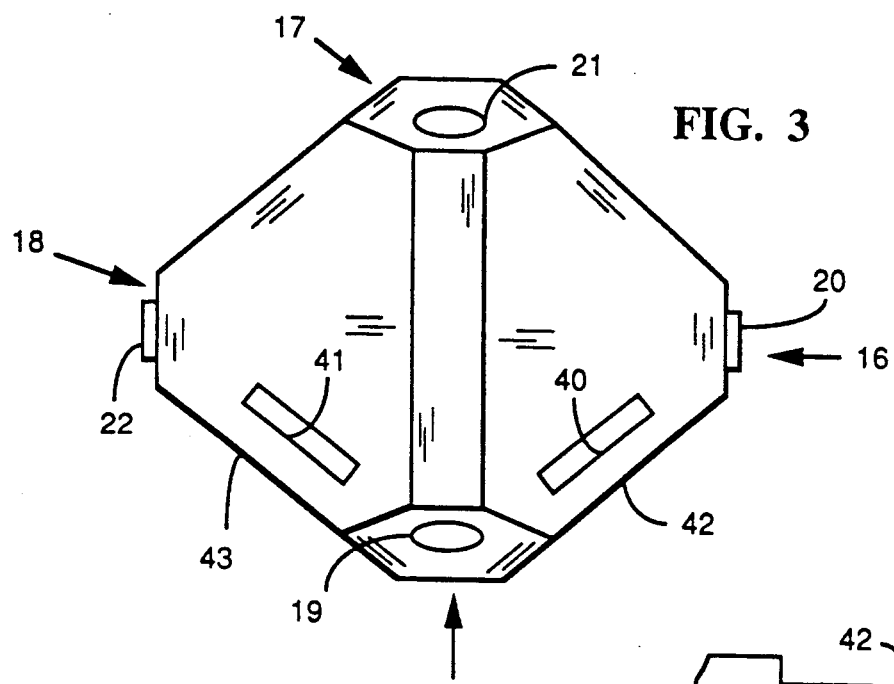
FIG. 3 is a bottom plan view of the out of plane ring laser gyroscope frame of FIG. 1.
Figure 4:
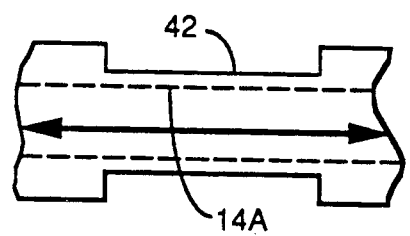
FIG. 4 is an elevation view of a portion of the frame of FIGS. 1 and 2.
Figure 5:
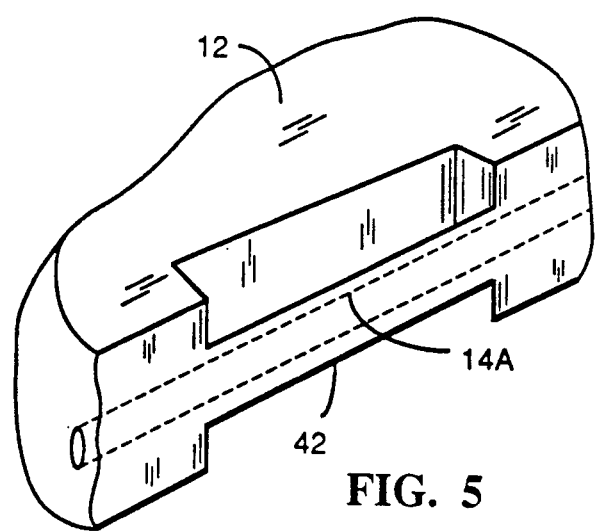
FIG. 5 is a perspective view of the frame portion of FIGS. 4 and 5.

Referring to FIGS. 1, 2 and 5, a passage 40 is formed through the frame 12 adjacent the bore 14A. A passage 41 similar to the passage 40 is formed in the frame 12 around the bore 14D. The passages 40 and 41 may be formed by drilling through the frame 12. The desired shapes of the frame portions 42 and 43 around the bores 14A and 14D, respectively, are achieved by further machining the frame 12. The frame portions 42 and 43 are preferably cylindrical or nearly cylindrical; however they may have a plurality of flat surfaces. For example, FIG. 6 shows the frame portion 42 to have an octagonal cross section; however, the invention is not limited to any particular any cross section of the frame portion 42.

Figure 6:
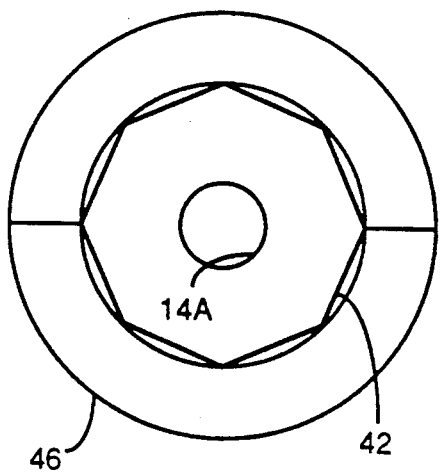
FIG. 6 is a cross sectional view taken about line 4—4 of FIG. 2 showing a pair of magnets mounted on a portion of the frame of FIGS. 4 and 5.
Figure 7:
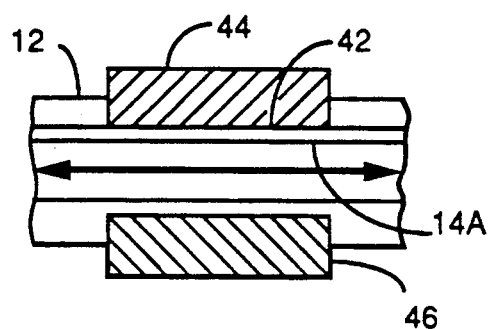
FIG. 7 is a second cross sectional view showing the pair of permanent magnets mounted on the frame portion of FIGS. 4 and 5.
Figure 8:
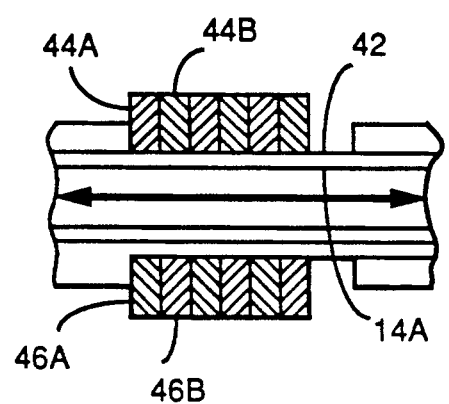
FIG. 8 is a cross sectional view showing a plurality of permanent magnets mounted on the frame portion of FIGS. 4, 5 and 6.

Referring to FIGS. 6-8 the magnetic field may be applied to the gain medium by fitting appropriately formed permanent magnets 44 and 46 together around the frame portion 42. The magnets 44 and 46 are preferably semicylindrical so that when placed together around the frame portion 42, they provide a uniform axial flux density to the gain medium. As shown in FIG. 8, the magnetic field may be provided by a plurality of small semicylindrical magnets 44A, 44B, etc. and 46A, 46B, etc. instead of the pair of magnets 44 and 46 The plurality of small magnets permits easy adjustment of the field applied to the gain medium.

Figure 9:
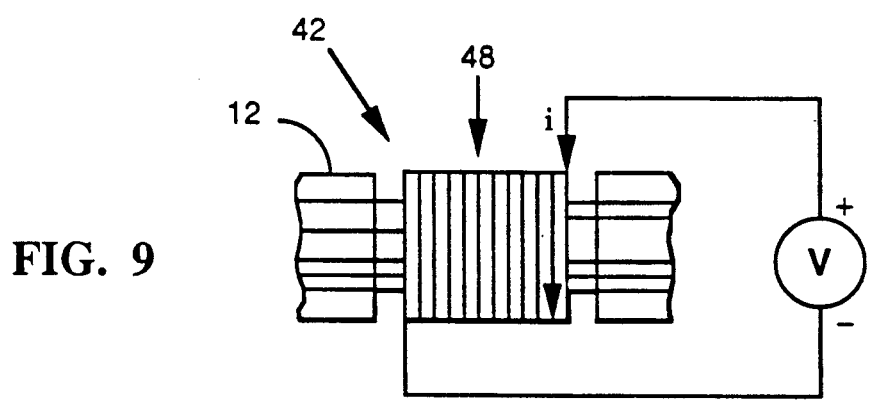
FIG. 9 represents a conductor coiled to form an electromagnet around the frame portion of FIGS. 4 and 5.

As shown in FIG. 9, it is also possible to provide the desired magnetic flux by winding a conductor 48 around the frame portion 42 and connecting the coil to a voltage source V to cause a suitable electric current, i, to flow in the conductor. The arrows in FIG. 9 indicate the direction of current flow.

Figure 10A:
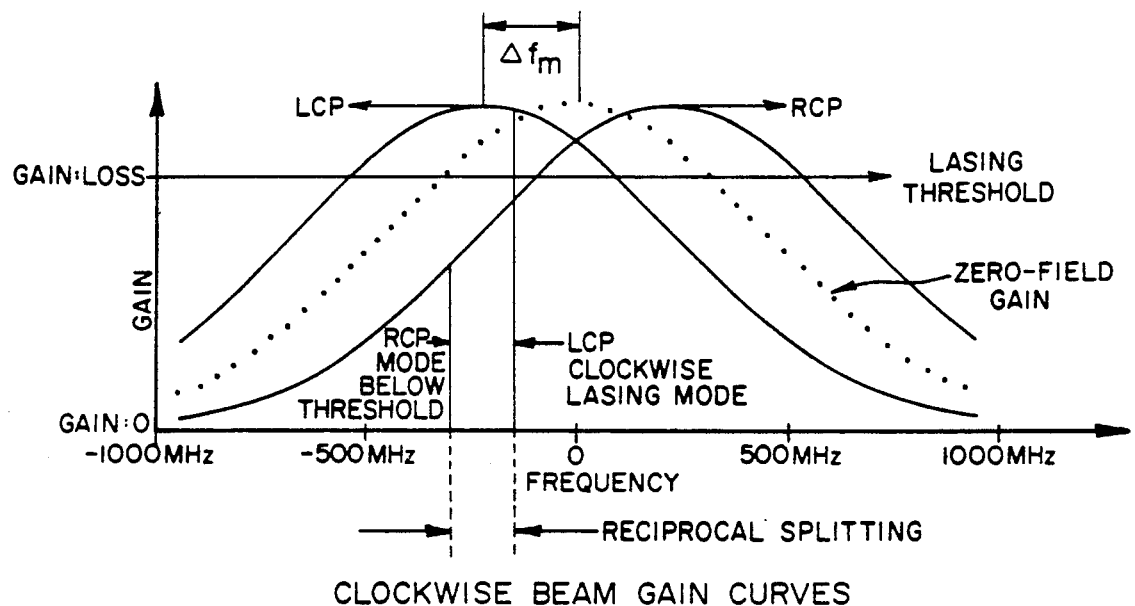
FIGS. 10a and b graphically illustrate magnetically induced frequency splitting in the gain medium for both right and left circularly polarized components of the clockwise and anticlockwise beams of the out of plane ring laser gyroscope of FIGS. 1-3.
Figure 10B:
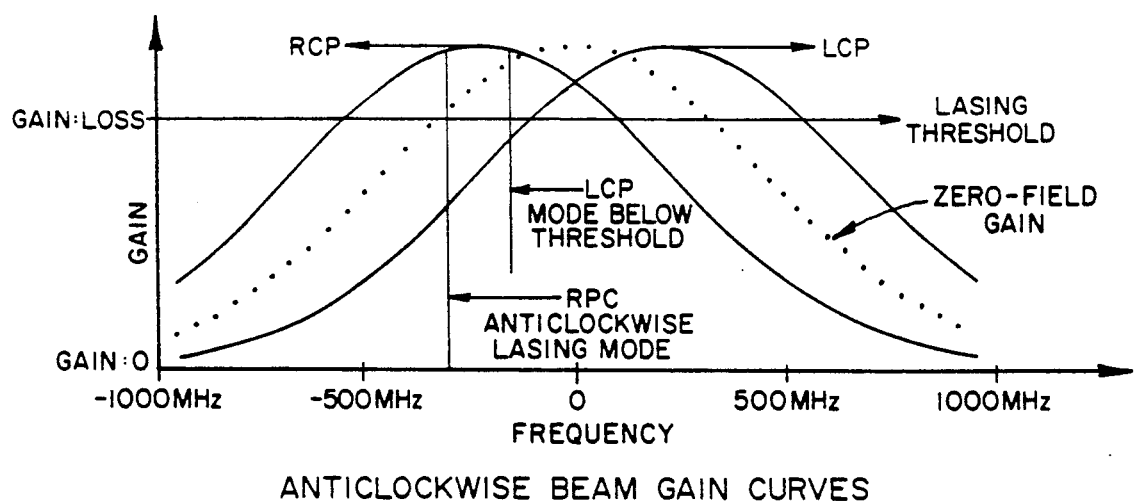

FIG. 10 shows gain profiles of the various waves in the cavity as functions of frequency. The dotted line curves represent the zero field gain curves. Application of the magnetic field to the gain medium causes the gain profiles to split in frequency and move in opposite directions. The relative movement is reversed for the clockwise and the anticlockwise pairs for each polarization. For example, FIG. 10 shows the LCP gain curve to move to lower frequencies with increasing magnetic field for the clockwise beam and to move to higher frequencies for the anticlockwise beam. Similarly, the RCP gain curve moves to higher frequencies for the clockwise beam as the magnetic field increases and to lower frequencies for the anticlockwise beam.

The gain profile width at gain equal to cavity loss is dependent on the discharge current and is typically about 600 MHz wide. Any frequency lying within the region where the gain is greater than the round-trip cavity loss will lase, but frequencies with gain less than this loss will not lase. The central portion of the gain profile for the LCP clockwise wave is spaced to the left of the lowest lasing frequency of the RCP clockwise wave. The upper portion of FIG. 10 shows that, for the chosen cavity length, the frequency at which the RCP clockwise beam resonates lies below the lasing threshold. This is a consequence of the shift in centers between the LCP and RCP gain curves. The shift in frequency is about 1.82 MHz per gauss of applied magnetic flux density. Therefore, the cavity may be tuned so that the only clockwise wave that will lase is the LCP wave.

Similarly, still referring to FIG. 10, the LCP anticlockwise gain profile curve is displaced to the right relative to the anticlockwise RCP gain profile curve so that the maximum-gain frequency band of the anticlockwise RCF wave does not overlap with that of the anticlockwise LCP wave. The lower portion of FIG. 10 shows that the resonating frequency for the anticlockwise LCP wave lies below the lasing threshold. Therefore, it is possible to adjust the cavity length so that the only anticlockwise wave that lases is the RCP wave. Because of the form of the frequency splitting, there is a wide range of both applied fields and cavity lengths for which only one polarization will lase and propagate in one direction while only the opposite polarization will lase and propagate in the other direction. The embodiment shown in FIG. 10 has only the clockwise LCP wave and the anticlockwise wave above the lasing threshold at a particular cacity length tuning, which is determined by the applied field. Similarly there is another cavity length at which only the clockwise RCP and anticlockwise waves are above the lasing threshold.

The output of the ring laser gyroscope is produced by combining the two beams so that they interfere. One of the mirrors, for example, the mirror 22, is partially transmissive so that a portion of each beam exits the cavity through the mirror. The beams exiting the cavity are initially at some angle relative to one another. In order to interfere, the beams must be nearly parallel. Each beam reflects internally from surfaces in a combining prism 50 mounted to the back of the mirror 22 so that the beams are essentially parallel when emerge from the prism 50. A photodetector 52 produces electrical signals indicative of the beat frequency of the interfering beams. Even when the ring laser gyroscope 10 is not rotating about its sensing axis, the beams that lase produce a beat frequency equally to the polarization splitting induced by the light path geometry, preferably around 100 MHz, which is readily measured. Rotation of the ring laser gyroscope 10 will produce higher or lower beat frequencies, depending on direction of rotation.

Thus, the geometry of the ring laser gyroscope 10 induces an effective nonreciprocal splitting in the frequencies of the two beams. Changes in the applied magnetic field will ideally cause no changes in the beat frequency because opposite polarizations are traveling in opposite directions through the gain medium so that any phase shifts induced by the Faraday effect are identical and do not appear in the beat signal.

The neon transition that produces the 632.8 nm wavelength has a shift factor of about 1.82 MHz/gauss. A preferred uniform axial magnetic flux density of about 100-200 gauss is required on all segments of the cavity 14 where the plasma exists to produce shifts of 200-400 MHz which are most likely favorable for device operation.

The splitting between the left and right circularly polarized modes in the cavity is primarily dependent on the light path geometry but it is also dependent on the phase shift that the reflective surfaces in the cavity induce between light polarized normal to the plane of incidence (s-type) and light polarized in the plane of incidence (p-type). This is known as mirror birefringence and has a weak temperature dependence. Suitable dielectric mirror design can minimize such effects. Remaining effects are predictable and may be modeled out of the gyro output with the placement of suitable temperature sensors.

Figure 11:
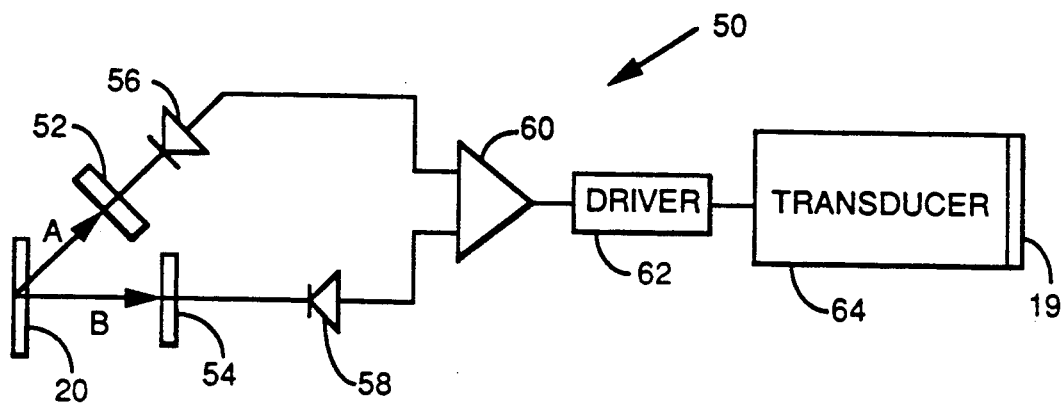
FIG. 11 is a block diagram of a path length control system that may be included in the invention.

One possible cavity length control scheme 50 is shown in FIG. 11. The purpose of cavity length control is to assure that the cavity length of the gyro 10 is set and maintained at a value that allows only one light mode to lase in each direction. As discussed above, these counterpropagating modes are of opposite polarization. Mirror 20 in the is partially transmitting to allow a small fraction of the clockwise (A) and anticlockwise (B) beams to exit the cavity 14 and impinge, respectively, on a circular polarizer 52, which passes LCP light but blocks RCP light, and a circular polarizer 54 which conversely passes RCP light but blocks LCP light. The light beams then strike detectors 56 and 58, respectively, which produce electrical signals in proportion to the intensities of the incident light beams. These electrical signals are fed into a differential amplifier 60 which produces a signal proportional to the difference of the inputs. If the signal at detector 56 is greater than that at detector 58 then the amplifier output may be, for example, positive while if the converse is true the output is negative. The amplifier output is scaled by driver circuitry 62 into a suitable driving voltage for a piezo-electric transducer (64) mounted on the back of diaphragm mirror 19.

Figure 12:
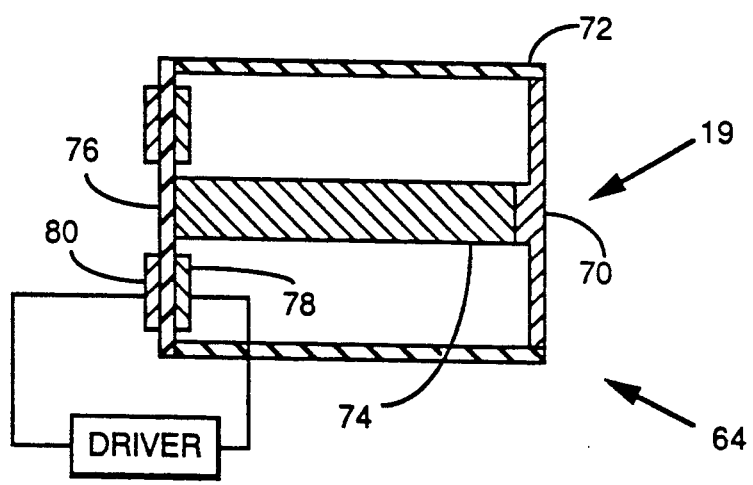
FIG. 12 is a cross sectional view of a diaphragm mirror that may be used to control the cavity length of the gyro of FIG. 1.

Referring to FIG. 12 the transducer 64 can be of a standard 'stack' or 'bimorph' design, which is well known in the ring laser gyro art. A suitable design for the transducer 64 is described in U.S. Pat. No. 4,383,763, which issued May 17, 1983 to Hutchings. That patent is hereby incorporated by reference into this disclosure. Movement of the mirror 19 either shortens or lengthens the cavity light path by an amount depending on the sign and magnitude of the applied driving voltage as a result of pressure applied to the diaphragm mirror 19, the design of which is well known in the art and is used on conventional laser gyros for cavity length control. As shown in FIG. 12, the mirror 19 includes a reflective surface 70 whose edges are fixed to a frame 72. A post 74 extends axially from the central portion of the surface 70 to a thin plate 76 which is generally parallel to the surface 70. Piezoelectric actuators 78 and 80 are mounted to opposite sides of the plate 76. Application of suitable voltages to the actuators 78 and 80 causes one of them, for example the actuator 78 to shorten from its quiescent dimension L while the other actuator expands. The effect of the dimensional changes of the actuators 76 and 78 is to move the post 74 axially. The mirror 19 therefore may be moved in or out relative to the frame 12.

The result of the described output optics and cavity length control servo mechanism 50 is to maintain the cavity length at a value where the intensities of the LCP clockwise beam and RCP anticlockwise beam are equal, which is seen from FIG. 10 to be the desired operating point. This cavity length control system is similar to that described in U.S. Pat. Application Ser. No. 486,662 by Graham J. Martin which describes the twin ring gyro configuration. That patent application is hereby incorporated by reference into this disclosure. The addition of the external circular polarizers 52 and 54 select against a mode of operation where clockwise and anticlockwise beam intensities are equal but RCP and LCP beam frequencies are symmetrically placed about the zero MHz frequency point in FIG. 10, which is not in accord with the operating manner of the device described herein.

Although the invention is described with reference to certain preferred embodiments, these embodiments are exemplary rather than limiting. Modifications to the embodiments described may be made without departing from the invention as defined in the appended claims.

What is claimed is:

1. A two mode out of plane ring laser gyroscope, comprising:
   a frame;
   a cavity formed in the frame to form a non-planar closed optical path;
   a gain medium in the cavity for producing right and left circularly polarized light beams propagating in both the clockwise and the counterclockwise directions in the cavity; and
   control means for manipulating the gain medium and the cavity length to allow only light of opposite circular polarizations to lase in opposite directions in the cavity to prevent mode locking between the two circularly polarized light beams.

2. The ring laser gyroscope of claim 1 wherein the gain medium produces a clockwise beam and an anticlockwise beam that both include a right circularly polarized component and a left circularly polarized component.

3. The ring laser gyroscope of claim 2 wherein the control means includes means external from the cavity for decreasing the center frequency of the gain profile for the clockwise left circularly polarized beam and the counterclockwise right circularly polarized beam and increasing the center frequency of the gain profile for the clockwise right circularly polarized beam and the counterclockwise left circularly polarized beam, further including means for adjusting the cavity length such that only one circular polarization component lases in the clockwise beam and only an opposite circular polarization component lases in the counterclockwise beam.

4. The ring laser gyroscope of claim 3 wherein the means for adjusting the cavity length includes:
   a plurality of mirrors mounted to the frame for defining the optical path;
   means for producing a first signal indicative of the intensity of the wave lasing in the clockwise direction;
   means for producing a second signal indicative of the intensity of the wave lasing in the anticlockwise direction; and
   means for adjusting the position of at least one mirror to control the optical path length.

5. The ring laser gyroscope of claim 1 wherein the control means comprises means external from the cavity for applying an axially directed magnetic field to the gain medium.

6. The ring laser gyroscope of claim 5, further comprising a magnet positioned around a portion of the gain medium.

7. The ring laser gyroscope of claim 5 wherein the frame includes a passage spaced apart from a portion of the cavity, further comprising a permanent magnet extending through the passage to surround a portion of the gain medium.

8. The ring laser gyroscope of claim 5 wherein the frame includes a passage spaced apart from a portion of the cavity, further comprising:
- a coiled conductor of electrical current extending through the passage to surround a portion of the gain medium; and
- means for applying electrical current to the conductor.

9. The ring laser gyroscope of claim 5 wherein the magnetic field decreases the center frequency of the gain profile for the clockwise left circularly polarized and the anticlockwise right circularly polarized mode and increases the center frequency of the gain profile for the clockwise right circularly polarized mode and the anticlockwise left circularly polarized mode, further including means for adjusting the cavity length such that only one polarization component lases in the clockwise beam and only one opposite polarization component lases in the anticlockwise beam.

10. Apparatus for preventing mode locking in a two mode ring laser gyroscope, comprising:
- means for defining a cavity that includes non planar closed optical path;
- a gain medium in the cavity for producing two light beams propagating in opposite directions in the cavity; and
- means for allowing only two modes to lase in the cavity, the two modes propagating in opposite directions in the cavity and having opposite circular polarizations.

11. A method for producing a non-reciprocal frequency separation to prevent mode locking between light waves in a two-mode ring laser gyroscope having a non planar cavity, comprising the steps of:
- (a) producing two circularly polarized light beams propagating in opposite directions in a gain medium confined to the cavity, each beam including a right circularly polarized component and a left circularly polarized component; and
- (b) controlling the gain medium and the cavity length to allow to lase only light of opposite circular polarizations propagating in opposite directions to prevent mode locking between the two circularly polarized light beams.

12. The method of claim 11 further including the step of adjusting the cavity length to permit only a first selected polarization to lase in a first direction around the cavity and a second polarization opposite from the first polarization to lase in a direction opposite to the first direction.

13. The method of claim 11 wherein step (b) of claim 11 comprises the step of applying an axially directed magnetic field applied to the gain medium.

14. The method of claim 11, further including the steps of:
- decreasing the center frequency of the gain profile for the clockwise left circularly polarized and the anticlockwise right circularly polarized mode;
- increasing the center frequency of the gain profile for the clockwise right circularly polarized component mode and the anticlockwise left circularly polarized mode; and
- adjusting the cavity length such that only one polarization component lases in the clockwise beam and only an opposite polarization component lases in the anticlockwise beam.

15. The method of claim 14 further including the step of applying an axially directed magnetic field applied to the gain medium.

16. A method for producing a non-reciprocal frequency separation between light waves in a non planar cavity in a ring laser gyroscope, comprising the steps of:
- (a) producing two circularly polarized light beams in a gain medium confined to the cavity; and
- (b) allowing only light of opposite circular polarizations to lase in opposite directions by applying an axially directed magnetic field to the gain medium.

17. A method for preventing mode locking in a two mode ring laser gyroscope, comprising the steps of:
- forming a frame to include a cavity;
- confining a gain medium within the cavity;
- defining a closed non planar optical path in the cavity; and
- controlling the gain medium and the cavity length so that the only modes allowed to lase have opposite circular polarizations and opposite directions of propagation in the cavity to prevent mode locking between the two circularly polarized light beams.

18. A clear path two mode out of plane ring laser gyroscope, comprising:
- a frame;
- a cavity formed in the frame to form a non-planar closed optical path;
- a gain medium in the cavity for producing a clockwise light wave and a counterclockwise light wave propagating in the cavity, each beam including a right circularly polarized component and a left circularly polarized component; and
- means external from the cavity for biasing the gain medium to suppress lasing of the right circularly polarized component of one of the beams and the left circularly polarized component of the other beam, thereby allowing to lase only light of opposite circular polarizations propagating in opposite directions in the cavity and preventing mode locking between the clockwise and counterclockwise light waves.

19. The ring laser gyroscope of claim 18 wherein the biasing means includes means for decreasing the center frequency of the gain profile for the clockwise left circularly polarized and the anticlockwise right circularly polarized component and increasing the center frequency of the gain profile for the clockwise right circularly polarized component and the anticlockwise left circularly polarized component, further including means for adjusting the cavity length such that only one polarization component lases in the clockwise beam and only an opposite polarization component lases in the anticlockwise beam.

20. The ring laser gyroscope of claim 19 wherein the means for adjusting the cavity length includes:
- a plurality of mirrors mounted to the frame for defining the optical path;
- means for producing a first signal indicative of the intensity of the wave propagating in the clockwise direction;
- means for producing a second signal indicative of the intensity of the wave propagating in the anticlockwise direction; and
- means for adjusting the position of at least one mirror to control the optical path length to maximize the sum of the first and second signals.

21. The ring laser gyroscope of claim 20 wherein the biasing means comprises means for applying an axially directed magnetic field to the gain medium.

22. The ring laser gyroscope of claim 21, further comprising a magnet positioned around a portion of the gain medium.

23. The ring laser gyroscope of claim 21 wherein the frame includes a passage spaced apart from a portion of the cavity, further comprising a permanent magnet extending through the passage to surround a portion of the gain medium.

24. The ring laser gyroscope of claim 21 wherein the frame includes a passage spaced apart from a portion of the cavity, further comprising:
  a coiled conductor of electrical current extending through the passage to surround a portion of the gain medium; and
  means for applying electrical current to the conductor.

25. The ring laser gyroscope of claim 21 wherein the magnetic field decreases the center frequency of the gain profile for the clockwise left circularly polarized and the anticlockwise right circularly polarized wave and increases the center frequency of the gain profile for the both the clockwise right circularly polarized component and the anticlockwise left circularly polarized wave, further including means for adjusting the cavity length such that only a first polarization component lases in the clockwise beam and only a second polarization component opposite to the first polarization component lases in the counterclockwise beam.

26. A method for measuring rotations and preventing mode locking in a clear path two mode out of plane ring laser gyroscope, comprising the steps of:
  providing a frame;
  forming a cavity in the frame to form a non-planar closed optical path;
  energizing a gain medium in the cavity for producing a clockwise light wave and a counterclockwise light wave propagating in the cavity, each beam including a right circularly polarized component and a left circularly polarized component; and
  biasing the gain medium with means external from the cavity to suppress lasing of the right circularly component of one of the beams and the left circularly polarized component of the other beam, thereby allowing to lase only light of opposite circular polarizations propagating in opposite directions in the cavity.

27. The method of claim 26 wherein the biasing step includes the step of decreasing the center frequency of the gain profile for the clockwise left circularly polarized and the anticlockwise right circularly polarized component and increasing the center frequency of the gain profile for the clockwise right circularly polarized component and the anticlockwise left circularly polarized component, further including the step of adjusting the cavity length such that only one polarization component lases in the clockwise beam and only an opposite polarization component lases in the anticlockwise beam.

28. The method of claim 27 wherein the step of adjusting the cavity length includes the steps of:
  mounting a plurality of mirrors to the frame for defining the optical path;
  producing a first signal indicative of the intensity of the wave lasing in the clockwise direction;
  producing a second signal indicative of the intensity of the wave lasing in the anticlockwise direction; and
  adjusting the position of at least one mirror to control the optical path length to maximize the sum of the first and second signals.

29. The method of claim 28 wherein the biasing step comprises the step of applying an axially directed magnetic field to the gain medium.

30. The method of claim 29, further comprising the step of placing a magnet around a portion of the gain medium.

31. The method of claim 29 including the steps of:
  forming a passage spaced apart from a portion of the cavity; and
  extending a permanent magnet through the passage to surround a portion of the gain medium.

32. The method of claim 29, further comprising the steps of:
  forming a passage spaced apart from a portion of the cavity;
  extending a coiled conductor of electrical current through the passage to surround a portion of the gain medium; and
  applying electrical current to the conductor.

33. The method of claim 29 including the steps of;
  applying the magnetic field to the gain medium to decrease the center frequency of the gain profile for the clockwise left circularly polarized wave and the anticlockwise right circularly polarized wave and increase the center frequency of the gain profile for the both the clockwise right circularly polarized wave and the anticlockwise left circularly polarized wave; and
  adjusting the cavity length such that only a first polarization component lases in the clockwise beam and only a second polarization component opposite to the first polarization component lases in the anticlockwise beam.

* * * * *